United States Patent
Holmes

[19]
[11] Patent Number: 5,945,978
[45] Date of Patent: Aug. 31, 1999

[54] HAPTIC COMPUTER OUTPUT DEVICE

[75] Inventor: Richard Holmes, Nuneaton, United Kingdom

[73] Assignee: Retinal Displays, Inc., Palo Alto, Calif.

[21] Appl. No.: 08/122,412
[22] PCT Filed: Apr. 21, 1992
[86] PCT No.: PCT/GB92/00729
  § 371 Date: Sep. 28, 1993
  § 102(e) Date: Sep. 28, 1993
[87] PCT Pub. No.: WO92/18925
  PCT Pub. Date: Oct. 29, 1992

[30] Foreign Application Priority Data

Apr. 20, 1991 [GB] United Kingdom .................. 9108497

[51] Int. Cl.$^6$ ......................................................... G09G 5/08
[52] U.S. Cl. ........................................... 345/157; 345/156
[58] Field of Search ........................... 345/156; 364/146; 901/34; 414/5; 341/20, 21; 434/114

[56] References Cited

U.S. PATENT DOCUMENTS

| | | |
|---|---|---|
| 3,263,824 | 8/1966 | Jones et al. . |
| 4,667,236 | 5/1987 | Presdner . |
| 4,841,292 | 6/1989 | Zeno . |
| 4,905,001 | 2/1990 | Penner ................................ 434/114 X |
| 5,184,319 | 2/1993 | Kramer ................................ 345/156 X |

FOREIGN PATENT DOCUMENTS

| | | |
|---|---|---|
| 0941312 | 4/1956 | Germany . |
| 2013617 | 8/1979 | United Kingdom . |
| 0259549 | 3/1988 | WIPO . |
| 92/05519 | 4/1992 | WIPO . |

OTHER PUBLICATIONS

M. Bergamasco et al, Advanced Inferfaces for Teleoperated Biomedical Robots, Proceedings of the Annual International Conference of the IEEE Engineering in Med. and Bio. Society vol. 11, Nov. 1989, pp. 912–913.

*Primary Examiner*—Amare Mengistu
*Attorney, Agent, or Firm*—Young & Thompson

[57] ABSTRACT

A haptic computer output device comprises a data glove 10 the finger and thumb extension 10A and 10B of which have spaced ring formations 13 and 14. Each ring formation 13 and 13 is formed with an inwardly-opening blind bore 21 spanned in gas-tight manner by a membrane 23 and conduits 20 within the ring formations selectively apply pressurised air to or relieve it from the bores 21 under the control of a valve assembly 34 in turn controlled by a computer 30. The computer generates images perceived on a visual system 32 by a wearer of the glove. Data concerning the spatial position and flexing of the glove 10 is transmitted via line 31 to the computer, which additionally generates a cursor on the visual system 32. When this interacts with other virtual objects to simulate a "touch" the appropriate bore 21 is inflated via valve assembly 34 to apply a tactile stimulus to the wearer of the glove.

13 Claims, 3 Drawing Sheets

HAPTIC COMPUTER OUTPUT DEVICE

BACKGROUND OF THE INVENTION

1. Field of the Invention

This invention relates to a haptic computer output device and more specifically to human/computer interface equipment which, when mounted on or adjacent a part of the human body, will apply tactile stimuli to the body under the control of the computer.

2. Description of the Related Art

Recent years have seen the development of "virtual reality". The user of the system is presented with computer-generated images which change in response to changes in the notional relative positions of the viewer and the virtual object so that the viewer has the sense of occupying a fully three-dimensional, artificial world. Virtual reality is described in United Kingdom Patent Specification Serial No. 2 201 069A and reference is made thereto for a fuller understanding of the present invention.

It is desirable that the viewer of virtual objects should be able to "interact" with them, such as by "picking them up" and "moving them about". For this it is desirable that one of the objects viewed is a cursor representing e.g. the hand of the viewer. By moving his real hand he causes corresponding movements of the cursor, and when this occupies the same apparent space as another virtual object the computer must react appropriately. If the object "contacted" is notionally movable the computer must show it moving; if notionally immovable the movement of the cursor must be arrested, all to preserve the simulation of reality.

A deficiency in the realism currently experienced when interacting in this way with virtual objects is that the viewer experiences no tactile sensations when the cursor representing his hand "touches" an object. This lack of one of the normal sensory experiences detracts from the illusion. If the experience of virtual reality is solely visual, or visual and auditory, the lack of the corresponding sensation of touch will remind the viewer that he is inhabiting an artificial world, enabling him to preserve sane of the detachment of a film or television audience and the experience will be less than the completely absorbing one which virtual reality has the potential to provide.

A principal object of the present invention is to redress this deficiency of previous virtual reality proposals.

SUMMARY OF THE INVENTION

In accordance with one aspect of the present invention there is provided a haptic computer output device comprising an exoskeleton member having digital extensions comprising ring formations adapted to encircle human appendages, at least same of said ring formations comprising a respective cavity located on the ring formation to open inwardly thereof, a membrane of a more resiliently deformable material than that of the exoskeleton member spanning the opening of the cavity in a gas-tight manner, and conduit means communicating with each said cavity whereby pressurised gas may be selectively introduced into the cavities to cause deformation of the respective membranes outwardly of the associated cavities and inwardly of the associated ring formations such that in use of the device the membranes may be caused selectively to apply tactile stimuli to human appendages inserted through the ring formations.

The device may be in the form of a data glove and the exoskeleton member may be adapted to be located on the back of a human hand with said digital extensions passing along the backs of the fingers or the fingers and thumb of said hand, said exoskeleton member being of a flexible material and said ring formations being adapted to retain the extensions in contact with the fingers or fingers and thumb during flexing movements of the latter.

Said cavities are preferably located on the ring formations at positions spaced angularly therearound from the associated extension.

Each said cavity is preferably a blind bore formed in the thickness of the exoskeleton member.

Said conduit means may be controlled by valve means which is in turn controlled by a computer which generates images perceived by the user of the device, and the computer may be adapted to apply tactile stimuli to the user in accordance with haptic incidents as perceived by the user.

In accordance with another aspect of the present invention there is provided a haptic computer output device comprising a member adapted to be positioned with one face thereof opposed to the body of a user of the computer, said member having in the thickness thereof a blind bore opening to said face, the opening of said blind bore being spanned by a membrane of a material more resiliently deferrable than the material of said member, said membrane being generally flat in the unstressed condition thereof, conduit means in said member opening to said bore and valve means controlled by the computer whereby gas under pressure may be introduced into or relieved from said bore thereby to control tactile sensations which will be applied to said user's body by the membrane when deformed by excess gas pressure in said bore.

Preferably a plurality of similar blind bores, each spanned by a respective membrane, are provided in respective formations of said member located thereon in mutually spaced relation and adapted to encircle different areas of the user's body, conduit means communicating with each said bore and the valve means being adapted selectively to admit pressurised gas to or to relieve pressurised gas from the individual bores under the control of the thereby to apply different stimuli to different areas of the user's body.

The member may be adapted to fit over the back of a hand of the user and may have finger portions to extend along the backs of the fingers or the fingers and thumb of said hand, at least two of said formations being provided in spaced relation on each said finger portion.

Each said formation may be in the form of a hoop comprising an inner U-shaped component nested in an outer U-shaped component, the outer U-shaped component being integral at the dismal ends of its arms with said member and the inner component having an aperture in the web portion thereof which cooperates with the outer component to provide said blind bore of said formation, the inner component being undercut around the periphery of the aperture to provide an annular rebate in which the periphery of the membrane is seated and adhesively bonded to the inner component.

The inner component is preferably additionally formed with a channel which, in the assembled condition of the two components, provides a conduit through the formation opening at one end to the aperture between the membrane and the outer component, said conduit serving to admit pressurised gas to or to relieve pressurised gas from the associated bore.

The device preferably additionally comprises means to output to the computer signals relating to the spatial position and/or shape of the device and the computer controls a display whereby said user perceives images generated by the computer including a cursor image corresponding to said device, the device being controlled by the computer so as to apply to the user's body tactile stimuli which correspond with the perceived interaction between said cursor image and other of said images.

The member is preferably locally at least twice as thick as the (or each) membrane at the bottom of, and around, the (or each) blind bore.

The member may be of a high-tear flexible polyurethane and (the or) each said membrane may be a disc of neoprene adhesively bonded at its periphery to the material of the member in the region of the opening of the associated blind bore.

Preferably control by the computer of the valve means is such that pressure within the or each blind bore is proportional to notional contact forces, so that the wearer experiences a pressure proportional to the forces which would be experienced if the "contact" were real. In other words pressure within the bore will be higher if an "immovable object" is "struck", or a "heavy object" is "picked up", than if "contact" is made with a "light" object.

BRIEF DESCRIPTION OF THE DRAWINGS

An embodiment of the present invention will now be described by way of non-limitative example with reference to the accompanying drawings, in which.

DESCRIPTION OF THE PREFERRED EMBODIMENTS

Figure 1:
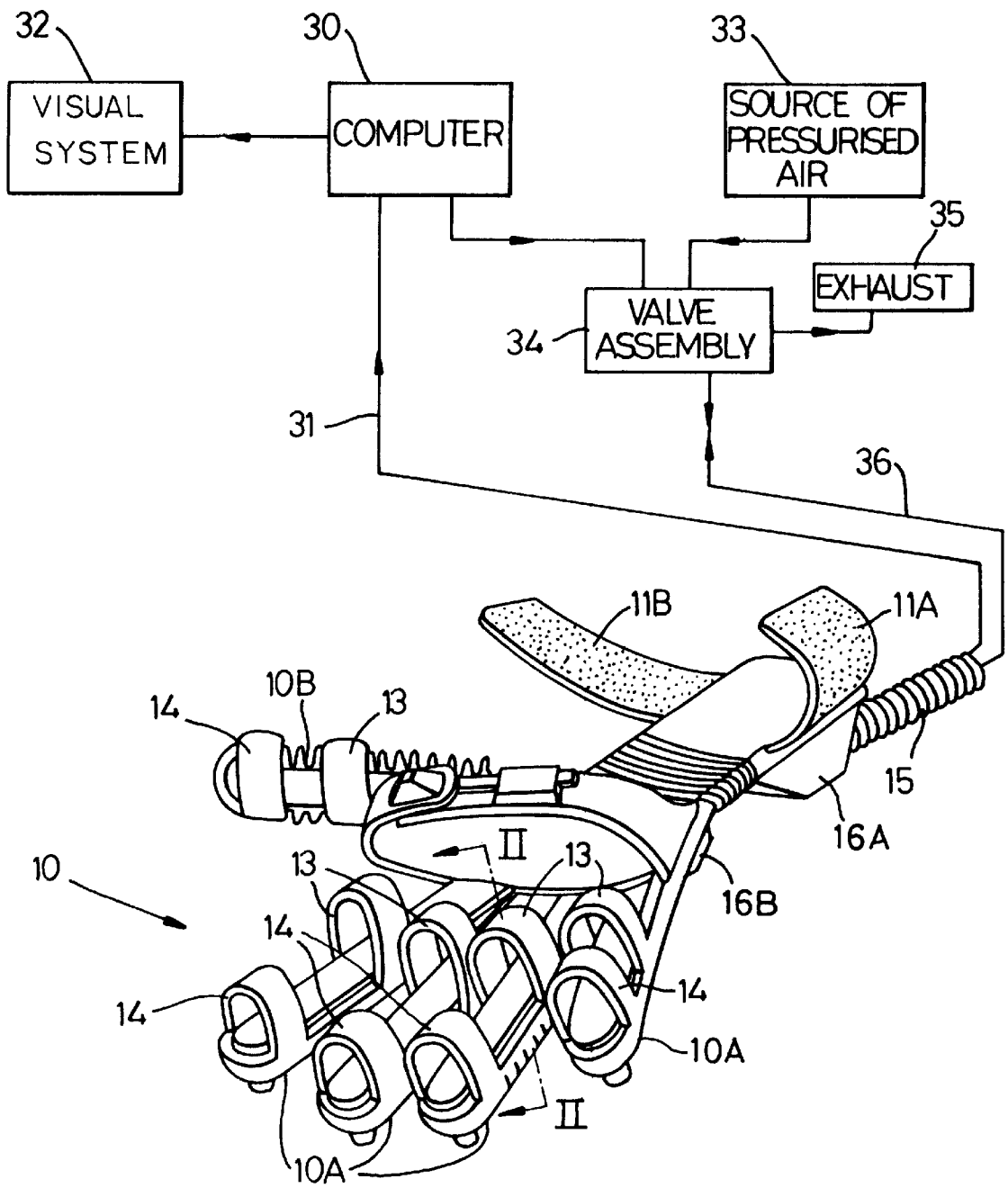
FIG. 1 illustrates a data glove in association with the other components of a virtual reality system.

The human/computer interface exoskeleton member or data glove 10 illustrated in FIG. 1 is adapted to be worn on the back of the hand and wrist by the provision of self-attaching bands 11A,11B. The main components of the member are of thick, transversely ribbed high-tear-strength polyurethane so that the member can bend to follow flexing movements of the wrist and fingers. The "glove" 10 has four finger extensions 10A and a thumb extension 10B which will pass along the backs of the fingers and thumb. To ensure that the elongated finger and thumb extensions 10A and 10B of the glove follow flexing movements of the fingers and thumb of the wearer each has a hoop or ring formation 14 near its tip. Additional, similar formations 13 are provided in spaced relation to the rings 14 intermediate the ends of the finger and thumb portions 10A, 10B.

Illustrated at 15 is a sheath through which flexible cables, ducts and any other necessary facilities may pass to manifolds 16A, 16B on the backs of the wrist and hand portions of the glove 10. Each of the fingers and the thumb has means (not shown) for generating a signal proportional to the flexing movement of that part of the glove relative to other parts, for example strain gages which generate electrical signals proportional to a tension loading. Means (not shown) is additionally provided for generating signals according to the position of the member 10 in space. These position and flexure monitoring means do not form part of the present invention and so will not be further described, except to say that in use of the data glove 10 the appropriate signals pass to a computer 30 via line 31. The computer generates a cursor viewed on a visual display system 32 by the wearer in such a way that the cursor undergoes changes corresponding with movement and flexure of the hand. The computer 30 also generates virtual objects viewed on the visual display system 32 and monitors interaction between them and the cursor caused by and flexing of the real hand wearing glove 10. The visual display system 32 may be a visual display unit of any known, conventional kind or may be an optical system employing liquid crystal VDUs individual to the eyes of the user of the kind described in the aforementioned U.K. Patent Specification No. 2 201 069A.

Figure 2:
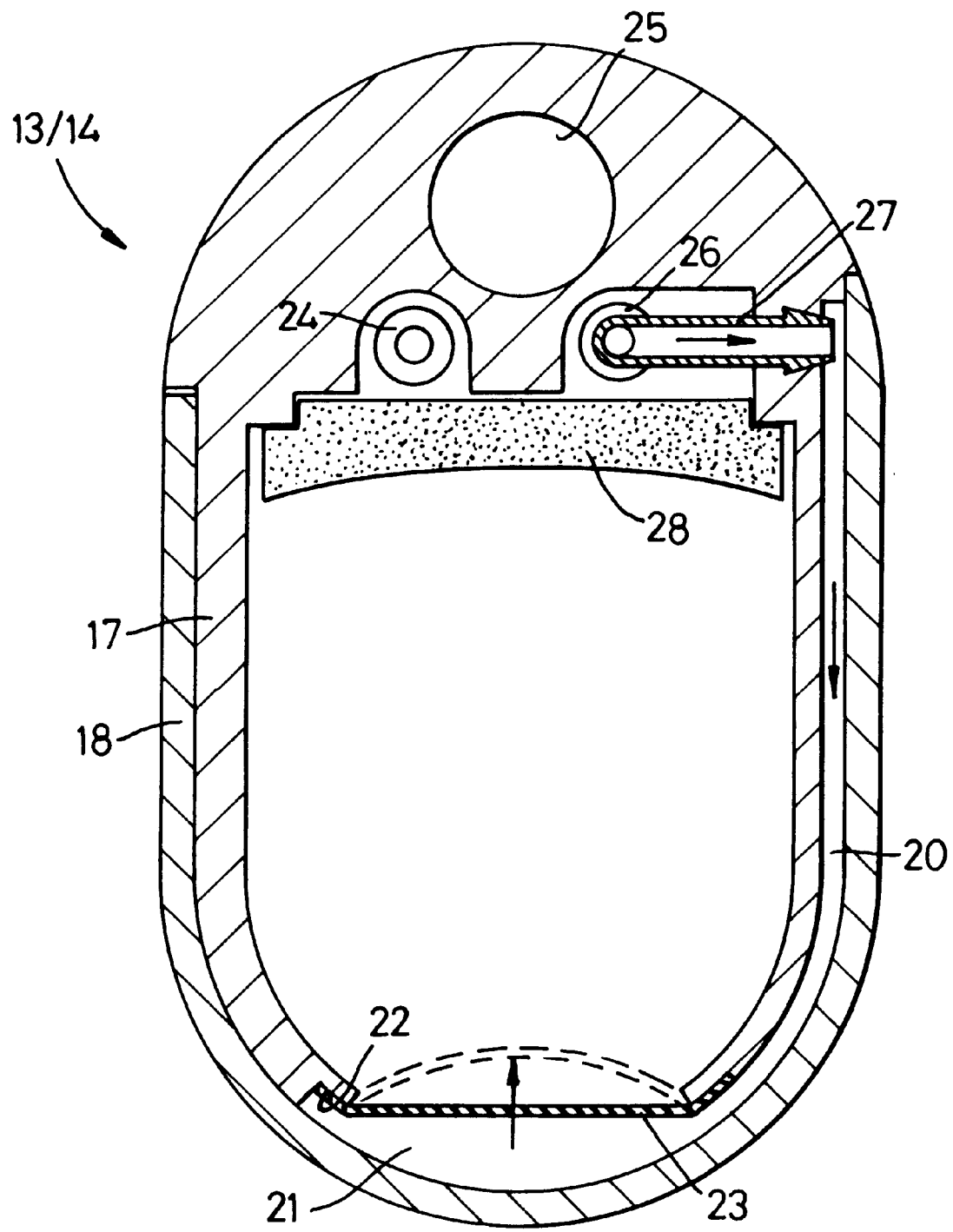
FIG. 2 is a cross-sectional view taken on the line II—II of FIG. 1.
Figure 3:
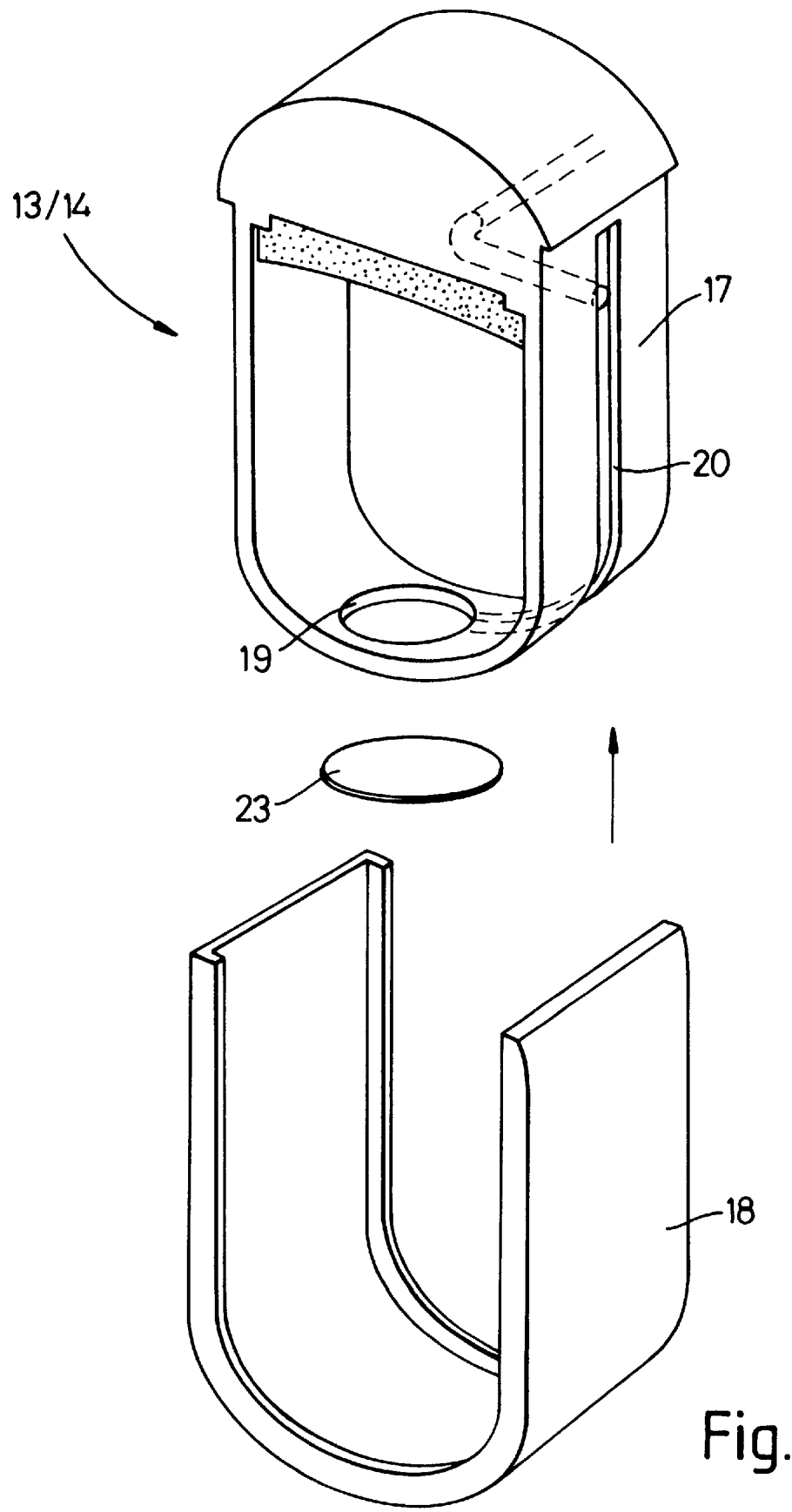
FIG. 3 is an exploded view of the assembly of FIG. 2.

As shown more clearly in FIGS. 2 and 3 each ring 13 and 14 comprises U-shaped inner 17 and outer 18 parts of which the inner is integral at the distal ends of its limbs with the associated finger or thumb portion 10A or 10B of the glove and so forms therewith a ring structure which will surround the thumb or finger, causing the finger or thumb portion of the glove to conform to its flexing movements. The web of the inner part 17 is formed with an aperture 19 and one of its limbs with a channel or groove 20 communicating at one end with the aperture. When the inner part 17 is nested in the outer part 18 as shown in FIG. 2 the groove 20 forms a conduit or passageway and the aperture 19 the opening of a blind bore 21 in the assembly. Around the aperture 19 the inner part 17 is undercut at 22 to provide a seat for the periphery of a membrane 23 of neoprene which spans the aperture 19. This membrane 23 is very much more elastically deformable than the material of the remainder of the glove. Locally the polyurethane of the hoop 13 or 14 is at least twice as thick as the membrane 23 at the bottom of and around the blind bore. The periphery of the membrane 23 is fixed in a gas tight manner to the inner part 17 and the membrane is of a sufficiently resilient material to deform in response to the presence of a super-atmospheric pressure in the cavity 21. The membrane 23 is shown in its unstressed condition in full lines in FIG. 2 and in a deformed or expanded condition in dotted lines. Due to its lesser thickness and greater deformability it will be the membrane and not the parts 17 and 18 which will respond to excess pressure in the cavity 21 by deforming. The bore 21 thus provides a substantially solid, non-deformable housing and the combined parts 17 and 18 ensure that substantially all reaction forces are vectored and act upon the membrane 23 to deform it inwardly of the ring 13 or 14.

Running longitudinally of each finger 10A and thumb part 10B of the glove is an enclosed passage 25 in which the facility (not shown)—e.g. a strain gage—for monitoring flexure of that part of the hand is located. Parallel with the duct 25 are further ducts 24 and 26 for pressurised air. A union 27 joins the duct 26 to the passageway 20. The duct 24 bypasses the ring 13 shown in FIG. 2 and conveys pressurised air to the blind bore of the finger-tip ring 14 of the same finger portion 10 of the glove. At the top of the ring its inner side is covered by a foam pad 28 which promotes wearer comfort and also serves to cover the channels in the finger or thumb part in which the air ducts 24 and 26 are located.

In use of the glove 10 shown the air ducts 24 and 26 are each connected through the sheath 15 and via two-way air lines 36 with a source 33 of air under pressure controlled by a valve assembly 34 which is in turn under the control of the computer 30. A suitable valve assembly 34 is the 12 valve EV/ET Electrical/Pneumatic Interface Card available from Clippard Instrument laboratory, Inc. of U.S.A. When the computer 30 determines that a particular finger or the thumb of the wearer of the glove has "touched" a virtual object as viewed on the visual system 32 it opens the appropriate valve of assembly 34 so that the bore 21 of the appropriate hoop or hoops 13/14 is inflated. This causes the associated membrane(s) 23 to deform into contact with the wearer's finger or thumb to provide a tactile stimulus corresponding to the "touch", and the pressure of the membrane 23 on the human body may be stronger or weaker depending on the nature of the "touch" determined by the computer 30. In the absence of a "touch" condition determined by computer 30 air is allowed to escape to ambience from the appropriate blind bores 21 through an exhaust line 35 controlled by the valve assembly 34.

It will be evident that only those bores 21 will be inflated and membranes 23 deformed which correspond with the determined "contact". Thus if only part of the viewed representation of the hand meets a virtual object only the corresponding part of the real hand will experience pressure. Realism will of course be enhanced by multiplying the bores 21 throughout the glove 10 and by making the pressure within each proportional to the notional load on the associated part of the hand.

Haptic devils according to the present invention may of course be adapted to be worn on parts of the human body other than a hand. If the spatial position of the whole body and flexing movements of the limbs and feet are also monitored by the computer 30 the devices may be provided on exoskeletal apparel worn on any part of the body.

I claim:

1. A haptic computer output device comprising an exoskeleton member (10) having digital extensions (10A, 10B), each of said digital extensions (10A, 10B) comprising, at ends and intermediate positions on said digital extensions (10A, 10B), at least one ring formation (13, 14) adapted to encircle a human appendage, said at least one ring formation (13, 14) comprising a cavity (21) opening inwardly of said at least one ring formation (13, 14), said cavity (21) having a membrane (23) spanning an opening of said cavity (21) in a gas-tight manner, said membrane (23) being of a more resiliently deformable material than that of said exoskeleton member (10), and conduit means (20, 27, 36) communicating with said cavity through which pressurized gas may be selectively introduced in said cavity (21) to cause deformation of said membrane (23) outwardly of said cavity (21) and inwardly of said at least one ring formation (13, 14) in such a manner that said membrane (23) may be caused to selectively apply tactile stimuli to a human appendage inserted through said at least one ring formation (13, 14).

2. A haptic computer output device as claimed in claim 1, wherein said exoskeleton member (10) is configured to fit on a backside of a human hand with said digital extensions (10A, 10B) passing along a backside of fingers or fingers and thumb of said hand, said exoskeleton member (10) forming a data glove of a flexible material wherein said ring formations (13, 14) of said exoskeleton member (10) exoskeleton member (10) are adapted to retain said digital extensions (10A, 10B) in contact with fingers, or fingers and thumb during flexing movements of said fingers, or fingers and thumb.

3. A haptic computer output device as claimed in claim 2, wherein said cavities (21) are located on said ring formations (13, 14) at positions spaced angularly around said ring formations.

4. A haptic computer output device as claimed in claim 1, wherein each said cavity (21) is a blind bore formed in a thickness of said exoskeleton member (10).

5. A haptic computer output device as claimed in claim 1, wherein said conduit means (20, 27, 36) is controlled by valve means (34), said valve means (34) being controlled by a computer (30) which generates images perceived by a user of said output device, said computer being adapted to control said exoskeleton member (10) through said valve means (34) in such a manner as to apply tactile stimuli to said user in accordance with haptic incidents as perceived by said user.

6. A haptic computer output device comprising an exoskeleton member (10) having a side adapted to be positioned on a body of a user of a computer (30), wherein said member (10) comprises a blind bore (21) opening to said side, an opening of said blind bore (21) being spanned by a membrane (23) of a material more resiliently deformable than the material of said member (10), said membrane (23) being generally flat when unstressed; said output device further comprising conduit means (20, 27) in said member (10) opening to said bore (21) and valve means (34) controlled by said computer (30) to selectively introduce into and relieve gas under pressure from said bore (21) thereby to control tactile sensations applied to said user's body by said membrane (23) when deformed by excess gas pressure in said bore (21).

7. A haptic computer output device as claimed in claim 6, further comprising a plurality of similar blind bores (21) each spanned by a membrane (23), said bores being provided in formations (13, 14) of said member (10), said formations (13, 14) being located on said member (10) in mutually spaced relation and adapted to encircle different areas of the user's body; conduit means (20, 27) communicating with each said bore (21), and said valve means (34) being adapted to selectively admit and to relieve pressurized gas from each of said plurality of blind bores (21) under control of said computer (30) thereby to apply different stimuli to different areas of the user's body.

8. A haptic computer output device as claimed in claim 7, wherein the member (10) fits over a backside of a hand of the user and has finger portions (10A, 10B) extending along the back of each finger or each finger and thumb of said hand, at least two of said formations (13, 14) being provided in spaced relation on each said finger portion (10A, 10B).

9. A haptic computer output device as claimed in claim 8, wherein each said formation (13, 14) has a shape of a hoop, said formation (13, 14) comprising an inner U-shaped component (17) nested in an outer U-shaped component (18), the outer U-shaped component (18) being integral with said member (10), said inner component (17) having an aperture (19) in a web portion of said inner component (17) which cooperates with the outer component (18) to provide said blind bore (21) of said formation, the inner component (17) being undercut around a periphery of said aperture (19) to provide an annular rebate (22) in which the periphery of the membrane (23) is seated and adhesively bonded to the inner component (17).

10. A haptic computer output device as claimed in claim 9, wherein the inner component (17) additionally comprises a channel (20) which, when said inner and outer components (17, 18) are assembled, provides a conduit (20) through the formation (13, 14), said conduit (20) opening at one end to the aperture (19) between the membrane (23) and the outer component (18), said conduit (20) serving to selectively admit to and relieve pressurized gas from said blind bore (21).

11. A haptic computer output device as claimed in claim 6, further comprising output means to output to said computer (30) signals relating to a spatial position and shape of the output device (10), wherein said computer (30) controls a display (32) whereby said user perceives images generated by said computer (30) including a cursor image corresponding to said output device (10), the output device (10) being controlled by said computer (30) in such a manner as to apply to the user's body tactile sensations when correspond with a perceived interaction between said cursor image and said perceived images.

12. A haptic computer output device as claimed in claim 6, wherein the member (10) is locally at least twice as thick as is each membrane (23) spanning each blind bore (21).

13. A haptic computer output device as claimed in claim 6, wherein the member (10) is composed of a high-tear flexible polyurethane and each said member (23) is a disc of neoprene adhesively bonded at a periphery of said disc to said member (10) in a region of an opening of the blind bore (21).

* * * * *